US008136861B2

(12) United States Patent
Rajon

(10) Patent No.: US 8,136,861 B2
(45) Date of Patent: Mar. 20, 2012

(54) ASSEMBLY INCLUDING A BODY-IN-WHITE AND TAILGATE FOR AUTOMOBILE

(75) Inventor: Alexis Rajon, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 12/867,654

(22) PCT Filed: Feb. 10, 2009

(86) PCT No.: PCT/FR2009/050211

§ 371 (c)(1),
(2), (4) Date: Sep. 23, 2010

(87) PCT Pub. No.: WO2009/101356

PCT Pub. Date: Aug. 20, 2009

(65) Prior Publication Data

US 2011/0042992 A1 Feb. 24, 2011

(30) Foreign Application Priority Data

Feb. 13, 2008 (FR) ..................................... 08 50914

(51) Int. Cl.
*B60J 5/10* (2006.01)

(52) U.S. Cl. .......................... 296/56; 296/50; 296/146.8

(58) Field of Classification Search .................... 296/50, 296/56, 146.1, 147, 146.8
See application file for complete search history.

(56) References Cited

U.S. PATENT DOCUMENTS 6,832,801 B2 * 12/2004 Zagoroff .................... 296/146.8
7,374,221 B2 5/2008 McClure et al.
7,845,053 B2 * 12/2010 Marsh et al. .................... 16/357

FOREIGN PATENT DOCUMENTS

| | | | |
|---|---|---|---|
| DE | 10005829 | C1 | 4/2001 |
| DE | 20201316 | U1 | 5/2002 |
| EP | 0808982 | A2 | 11/1997 |
| EP | 1495887 | A2 | 1/2005 |
| EP | 1914099 | A1 | 4/2008 |

OTHER PUBLICATIONS

Preliminary Search Report of FR 0850914; Sep. 10, 2008; Marlon Schnedler.
English abstract of EP 1914099, Apr. 23, 2008.
International Search Report of PCT/FR2009/050211; Aug. 4, 2009; Schnedler, Marlon.
English abstract of EP 1495887, Jan. 12, 2005.
English abstract of DE 10005829, Apr. 26, 2001.
English abstract of DE 20201316, May 23, 2002.

* cited by examiner

*Primary Examiner* — Lori Lyjak
(74) *Attorney, Agent, or Firm* — Olser, Hoskin & Harcourt LLP

(57) ABSTRACT

An assembly includes a body of an automobile and a tailgate mounted on the body so as to be movable between an open position and a closed position. The assembly also includes: an opening assistance device mounted between the body and the tailgate in order to apply a pushing force on the tailgate that tends to move the latter into an open position; and at least one abutment provided on the body, for applying on the opening assistance device, when the tailgate is in the closed position, a force opposite to the pushing force thereof so that the tailgate is not subjected, or barely subjected, to the pushing force of the opening assistance device.

12 Claims, 3 Drawing Sheets

ASSEMBLY INCLUDING A BODY-IN-WHITE AND TAILGATE FOR AUTOMOBILE

The present application is the United States National Stage Entry of International Application Number PCT/FR2009/050211, filed Feb. 10, 2009 which claims priority to French Patent Application No. 08 50914 filed, Feb. 13, 2008 the entirety of both of which is incorporated herein by reference.

FIELD OF THE INVENTION

The invention relates to the technical field of automobile openings and in particular the tailgates of such automobiles.

BACKGROUND OF THE INVENTION

An automobile tailgate comprising a rigid box made from a glass fibre-reinforced thermoplastic material is known, the box being reinforced by a metallic structure. This is the case for example for the Mazda 5 vehicle currently on the market. The tailgate is mounted on the automobile body-in-white so as to be movable between an open position and a closed position. It is connected to the body by hinges located on the top part of the box and by cylinders providing assistance when opening it.

Due to the metallic structure of its box, the tailgate can respect aesthetic specifications since its rigidification prevents it from deforming when it is in closed position on the body. The metallic structure also avoids fatigue which could lead to breakage of the box.

Each cylinder in fact applies a pushing force on the tailgate placed in open or closed position on the body. Since this pushing force generates stresses in the tailgate, the latter could deform, which is not acceptable for the vehicle aesthetics, especially when the tailgate is in closed position on the body. The clearances and degrees of flushness of the tailgate bodywork parts with the neighbouring parts are in fact determined very precisely and must not be modified through deformation of the tailgate.

However, due to the metallic structure of the box, this type of tailgate does not meet current requirements to lighten the automobile.

OBJECT AND SUMMARY OF THE INVENTION

The purpose of this invention is to provide a solution to this requirement, thanks to a tailgate whose box is made mostly from plastic material, in particular fibre-reinforced thermoplastic material. Such a tailgate would respect the aesthetics specifications regarding the clearances and degrees of flushness between the tailgate bodywork and the rest of the vehicle bodywork. It would also avoid the fatigue caused by deformation of the tailgate, which could result in breakage of the box.

The invention therefore relates to an assembly including a body of an automobile and a tailgate mounted on the body so as to be movable between an open position and a closed position, comprising:

- an opening assistance means mounted between the body and the tailgate in order to apply a pushing force on the tailgate that tends to move the latter into an open position;
- at least one abutment provided on the body, for applying on the opening assistance means, when the tailgate is in closed position, a force opposite to the pushing force thereof so that the tailgate is not subjected, or barely subjected, to the pushing force of the opening assistance means.

Consequently, at least some of the stresses generated by the opening assistance means when the tailgate is in closed position are compensated by the force applied by the body on the opening assistance means.

The tailgate is therefore less stressed by the pushing force of the cylinders when it is placed in closed position on the body. It can therefore be made less rigid. The tailgate can then be lightened while respecting the vehicle's aesthetics and mechanical strength specifications.

In particular, the abutment is designed so that the opening assistance means is in contact with it when the tailgate is placed in closed position on the body. The reaction force applied by the abutment on the opening assistance means therefore opposes the pushing force of the opening assistance means.

The invention may also comprise one of the characteristics in the following list:

- the opening assistance means comprises a cylinder applying a pushing force along a given axis when the tailgate is placed in closed position,
- the opening assistance means may also comprise at least one connecting part, preferably metallic, connecting the cylinder to the tailgate, at least one surface of the abutment on which the opening assistance means may rest is normally substantially parallel to the pushing force axis. "Substantially parallel to the pushing force axis" means that the normal to the abutment surface is not inclined by more than 45° with respect to the pushing force axis. As a result, the abutment reaction force opposes the cylinder pushing force more efficiently when the tailgate is in closed position,
- at least one of the abutments is designed on the body so that at least one bearing surface of the abutment intersects the pushing force axis when the tailgate is placed in closed position on the body. The "bearing surface" is the abutment surface intended to be in contact with the cylinder or the connecting part. This surface does not necessarily consist of one entire side of the abutment. In this embodiment, since the force on the abutment acts along the pushing force axis, the pushing force of the piston is not likely to create a torque generating stresses in the tailgate;
- at least one of the abutments is designed so that one end of the cylinder rests against the abutment when the tailgate is placed in closed position on the body;
- at least one of the abutments is designed so that the connecting part rests against the abutment when the tailgate is placed in closed position on the body. This prevents the end of the piston, which is generally made from plastic material, from being damaged by rubbing against the abutment, which could cause the piston to become separated from the connecting part;
- the assembly comprises means for centring the connecting part with respect to the body, when the tailgate is placed in closed position on the body. This is advantageous especially when the body abutment bearing surface does not intersect the piston pushing force axis, since this prevents some movements of the connecting part and also opposes the torque created by the pushing force and the reaction force since these two forces are not colinear;
- in particular, at least one of the abutments comprises a groove in which a projection of shape substantially complementary to that of the groove, fastened to the connecting part, can engage when the tailgate is placed in closed position on the body. The connecting part is therefore unable to rotate, at least in a direction perpendicular to the tailgate due to the presence of the groove. Consequently, the torque does not deform the connecting part in torsion. The tailgate therefore does not move from its original position;

the abutment is formed on the body by stamping. Consequently, the abutment manufacturing costs are very low, since its manufacture requires no specific additional steps, it being formed at the same time as the rest of the body. It could also be added, for example by welding to the body;

the tailgate comprises a box made at least partially from plastic material, especially thermoplastic material, in particular reinforced such as glass fibre-reinforced polypropylene, which substantially lightens the automobile.

The invention also relates to an automobile body-in-white belonging to the assembly according to the invention.

BRIEF DESCRIPTION OF THE DRAWINGS

The invention will be better understood from the following description, given solely by way of example and by referring to the drawings wherein.

MORE DETAILED DESCRIPTION

Figure 1:
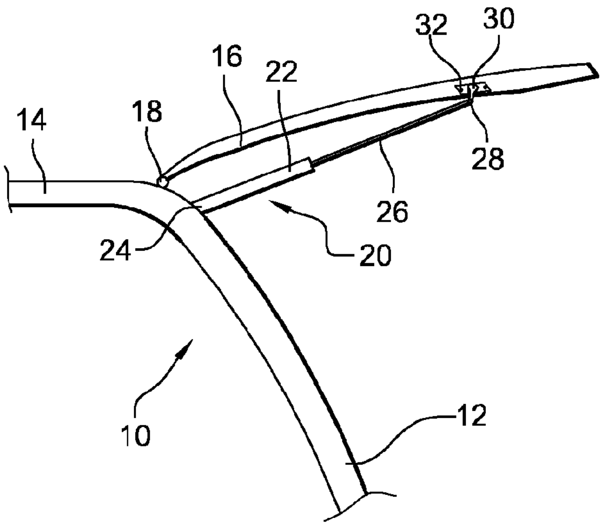
FIG. 1 is a lateral schematic view of the rear of an automobile structure, showing a tailgate in open position.

FIG. 1 shows the rear of an automobile structure 10, formed by the body-in-white of this automobile. As can be seen, the body 10 comprises in particular two rear pillars 12, delimiting the rear of the vehicle, as well as a roof pillar 14 delimiting the upper part of the vehicle.

A tailgate 16 forming the vehicle opening, consisting of a tailgate box covered by bodywork parts and a rear window, is located between the two rear pillars 12. This tailgate 16 is mounted on the body so as to be movable between an open position and a closed position. It is connected to the body-in-white 10 by hinges 18 located on the top end of the tailgate and by cylinders 20 located on each side of the tailgate and providing assistance when opening it.

Each cylinder 20 comprises a frame 22 of which one end 24 is connected to the body and can rotate with respect to the body. A piston 26 is engaged in this frame 22, so that the piston can move in translation with respect to the frame 22 along an axis corresponding to the longitudinal axis X of the cylinder. Each cylinder 20 applies a pushing force on the tailgate in the direction corresponding to the piston translation axis, tending to move the tailgate in closed position to open position. The piston 26 is connected to the tailgate 16 by an end 28, opposite to the end 24 of the frame.

The end 28 of the piston is connected to a connecting part 30 of longitudinal direction substantially perpendicular to the piston translation axis, irrespective of the tailgate position. This part 30 is also attached to the side of the tailgate box by screws 32. As can be seen on FIG. 2, the connecting part 30 comprises a cone-shaped body 34 and comprises at its end a plate 36, the latter being attached to the tailgate with screws or rivets 32. The connecting part 30 also comprises at its end opposite to the plate a convex shape such as a ball. The end 28 of the piston forms a concave part designed to cooperate with the ball on the connecting part, for example by clipping onto it.

The assembly of the cylinder and the connecting part forms a means to assist the opening of the tailgate.

Figure 2:
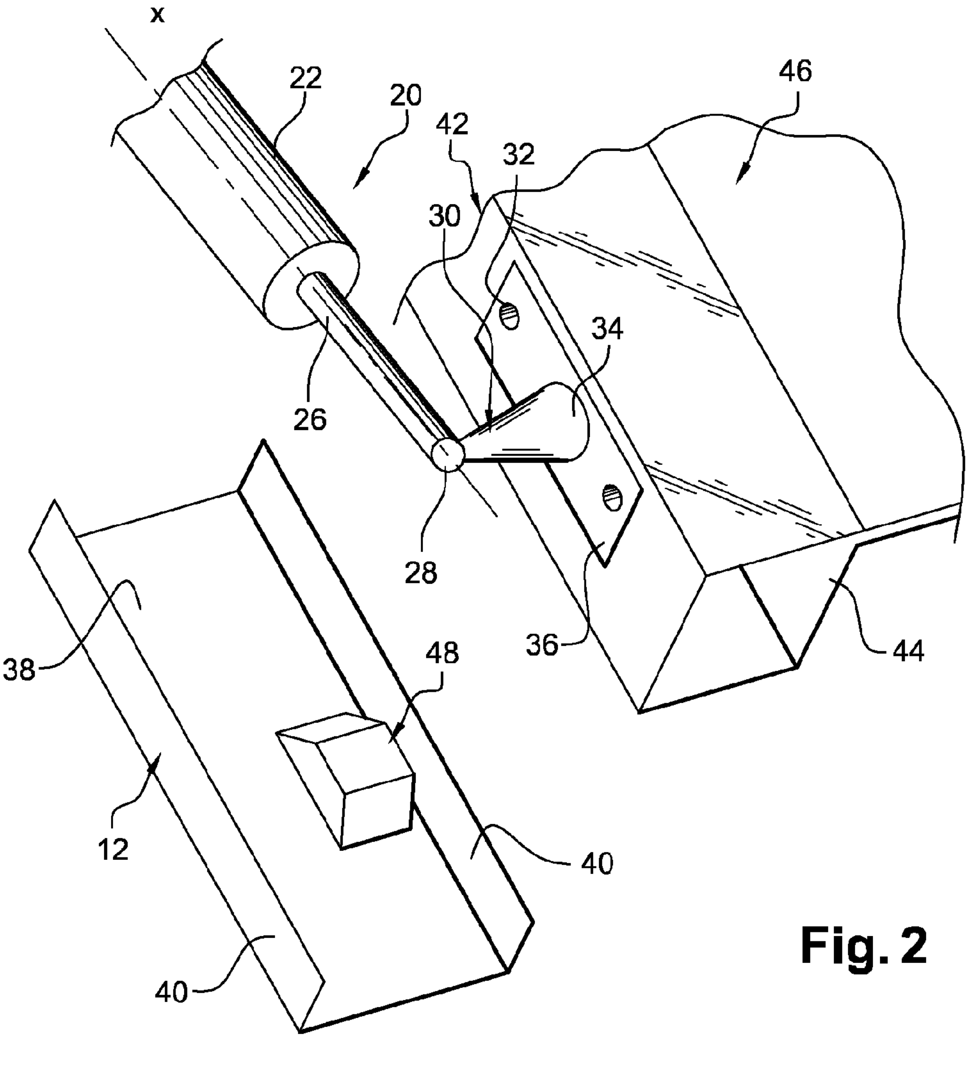
FIG. 2 is a perspective view of a detail of an assembly of the body and the tailgate according to one embodiment of the invention, when the tailgate is placed in a position open a few degrees.

As can also be seen on FIG. 2, the pillar 12 of the body is formed at its rear end by a generally U-shaped profile and comprising a bottom 38 and two side walls 40. The tailgate consists of a box 42 forming at its end a U-shaped profile 44, on which a rear window 46 is glued, such that the tailgate forms hollow rigidification bodies at this point. The tailgate box is made from plastic material, in particular reinforced thermoplastic material, such as glass fibre-reinforced polypropylene. The window is generally made from glass.

Figure 3:
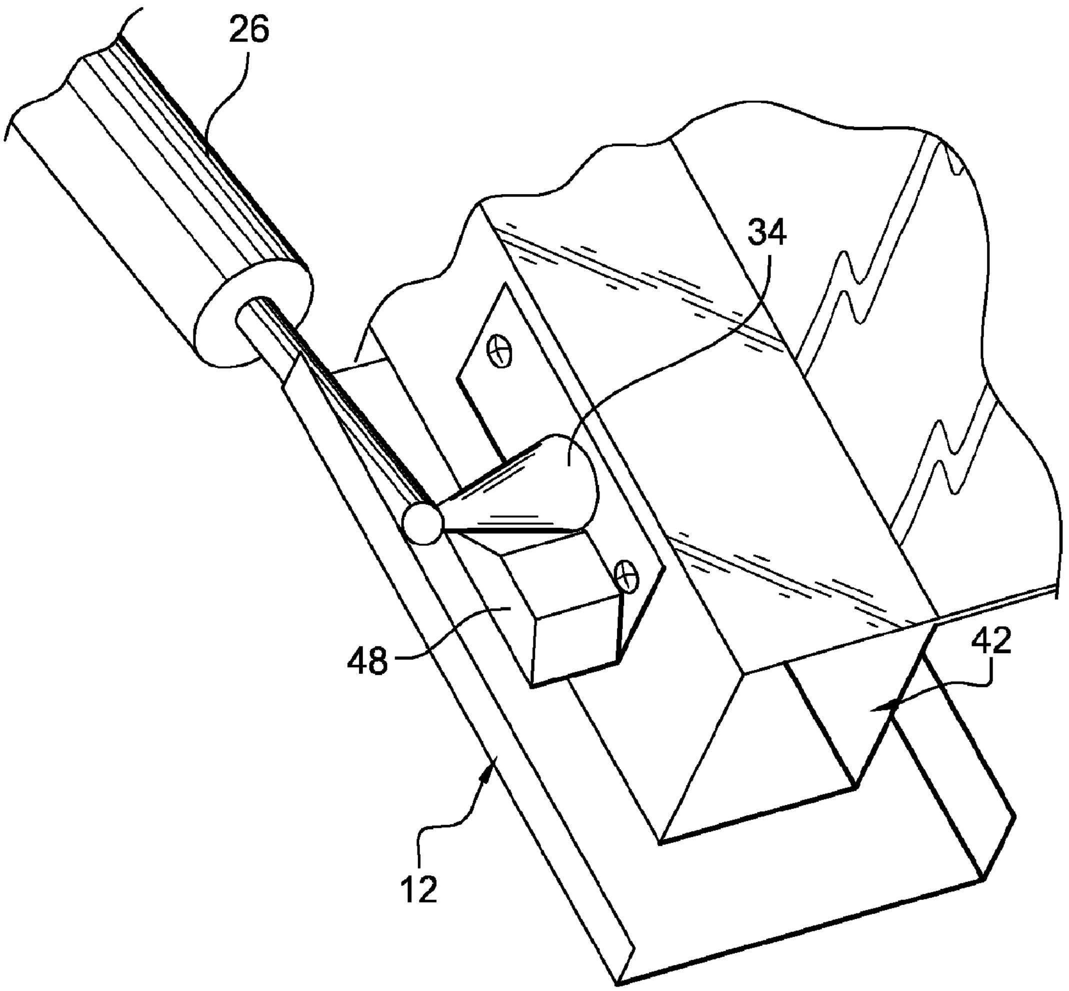
FIG. 3 is a perspective view of the assembly shown on FIG. 2, when the tailgate is placed in closed position on the body.

The body-in-white also comprises an abutment 48, formed by stamping, at the same time as the rest of the body. This abutment comprises an upper side and four lateral sides connecting the upper side to the rest of the body. As can be seen on FIG. 3 representing the tailgate in closed position, this abutment acts as support for the connecting part 30 when the tailgate box 42 is placed on the body 12 in closed position. The connecting part 30 rests on a lateral side of the abutment oriented towards the top of the vehicle and normally substantially parallel to the piston translation axis when the tailgate is placed on the body 12 in closed position.

As a result, the force applied by the abutment on the piston opposes the pushing force of the piston on the tailgate. Consequently, stresses due to the pushing force of the piston are not transmitted to the tailgate, whose rigidity can therefore be reduced.

Note that the clearance between the connecting part 30 and the abutment 48 must be tight so that the pushing force of the piston does not generate excessive stresses in the tailgate.

Figure 4:
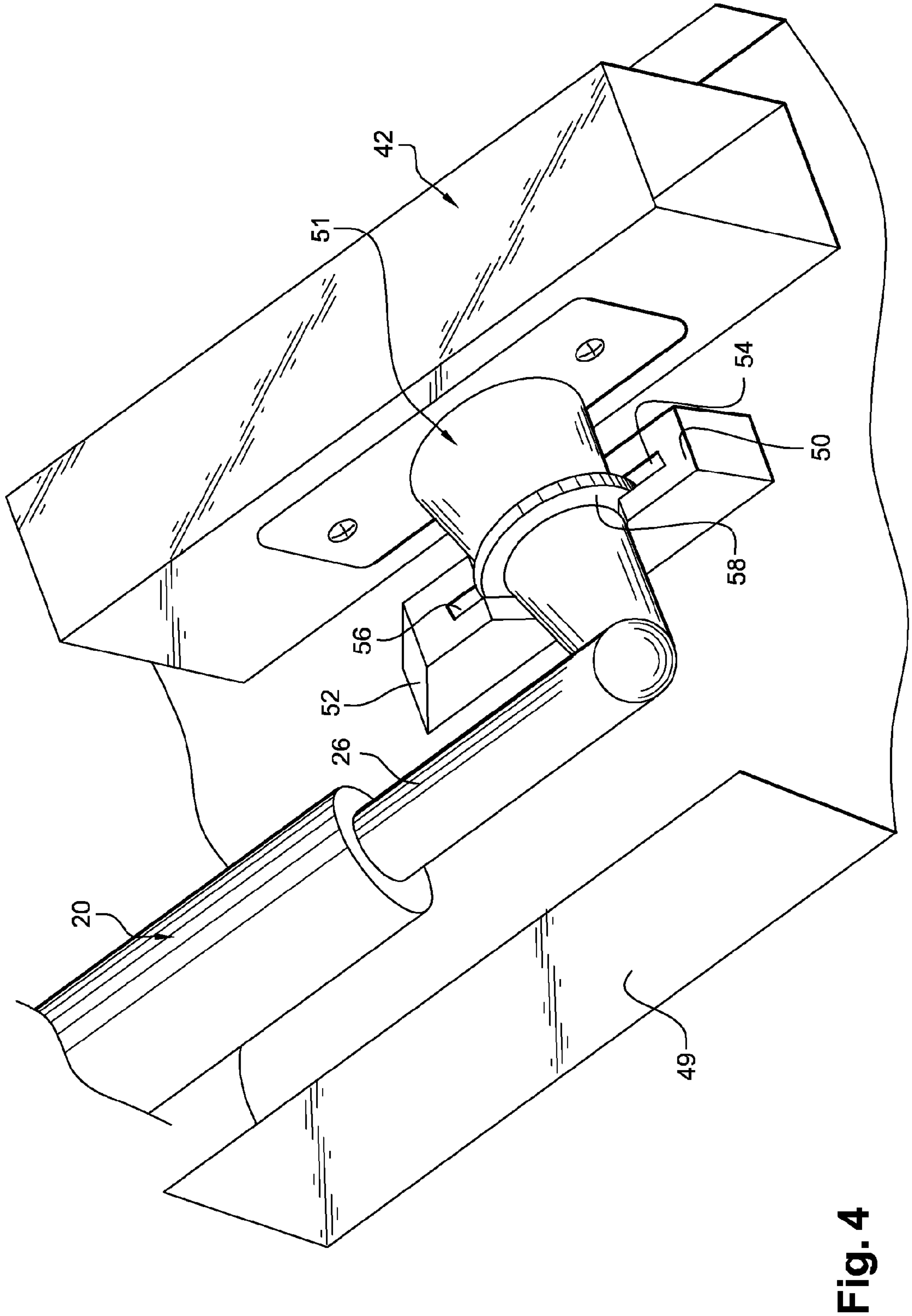
FIG. 4 is a perspective view of a detail of an assembly according to another embodiment of the invention, when the tailgate is placed in closed position on the body.

FIG. 4 shows a detail of an assembly according to another embodiment of the invention. The references are identical to those on FIGS. 2 and 3 if the objects designated by these references are identical.

In this embodiment, the body 49 and the tailgate box 42 are also connected by the cylinder 20 comprising a piston 26. The piston is connected to the tailgate box 42 by a connecting part 51.

In this embodiment, the body comprises two abutments 50, 52, between which the connecting part 51 will engage when the tailgate is placed in closed position on the body.

Each abutment 50, 52 comprises an upper side and four lateral sides connecting the upper side to the rest of the body. Each abutment 50, 52 comprises a groove 54, 56, opening onto a lateral side and onto part of the upper side of the abutment. The groove 54 of the abutment 50 opens onto the side of this abutment oriented towards the top whereas the groove 56 of the abutment 52 opens onto the side of this abutment oriented downwards, the two grooves being opposite each other. The two abutments 50, 52 are located opposite each other, such that the two grooves 54, 56 are aligned in a direction substantially parallel to the direction of the piston translation axis when the tailgate is placed on the body in closed position, corresponding to the pushing force axis.

The connecting part 51 comprises a collar 58 shaped so as to engage in the grooves 54 and 56, whose dimensions are substantially complementary to those of the groove. This collar is located on a median section of the body of the connecting part 51 and positioned so that it can engage in each channel.

The cone-shaped body of the connecting part is therefore in contact with the lateral side of the abutment 50, this side producing a reaction force on the connecting part which opposes the piston pushing force. This side is normally substantially parallel to the piston translation axis, corresponding to the pushing force axis. As a result, the reaction force applied by the abutment on the connecting part opposes the pushing force. In association with the pushing force, however, it could create a torque generating a torsion of the connecting part and, consequently, bad positioning of the tailgate.

Since the collar 58 is centred in each groove 54, 56, the connecting part 30 cannot twist and the tailgate remains correctly positioned. Bevel-shaped collar edges and a corresponding shape of the groove on the abutment can make it easier to start engagement of the collar and then hold it in position.

The lateral sides of the abutments 50, 52 are normally slightly inclined with respect to the direction of the pushing force axis, so that the connecting part is positioned between the abutments more precisely when closing the tailgate, without damaging the part or one of the abutments.

Clearance between the connecting part 30 and the abutment 50 must be tight so that the pushing force of the piston does not generate excessive stresses in the tailgate.

The invention is not limited to the previously described embodiments.

The body could in fact comprise an abutment located in the piston translation axis, corresponding to the pushing force axis, when the tailgate is placed on the body in closed position. In this case, the end of the piston is designed to rest on a side of the abutment in this position. No torsion force is transmitted to the body since the two forces are substantially colinear. Two abutments between which the connecting part engages could also be planned, with no grooves in these abutments. These two abutments will in fact be sufficient on their own to centre the connecting part with respect to the body, in order to block rotation of the connecting part at least partially and prevent its torsion.

A single abutment could also be planned, comprising a groove as described in the embodiment shown on FIG. 4, which will also prevent torsion of the connecting part.

In addition, the abutment is not necessarily formed with the body and could be added to the part by gluing, welding or by any other means. Equally, the shapes of the abutment, groove and collar are not limited to those described.

The connecting part may also be fastened to the body by means other than those described.

The invention may also be implemented for a tailgate box made from a material other than a thermoplastic material, for example a thermosetting material.

The invention claimed is:

1. An assembly including a body of an automobile and a tailgate mounted on the body so as to be movable between an open position and a closed position, comprising:

an opening assistance device mounted between the body and the tailgate in order to apply a pushing force on the tailgate that tends to move the tailgate into the open position, the opening assistance device comprising a cylinder applying a pushing force along a first when the tailgate is placed in the closed position;

at least one abutment provided on the body, for applying on the opening assistance device, when the tailgate is in the closed position, a force opposite to the pushing force thereof so that the tailgate is not more than barely subjected to the pushing force of the opening assistance means, a connecting part connecting the cylinder to the tailgate and means for centering the connecting part with respect to the body, when the tailgate is placed in the closed position on the body, the at least one abutments being designed so that the connecting part rests against the at least one abutment when the tailgate is placed in closed position on the body and at least one of the at least one abutments comprising a groove in which a projection of shape substantially complementary to that of the groove, fastened to the connecting part, can engage when the tailgate is placed in the closed position on the body.

2. An assembly according to claim 1, wherein at least one surface of the at least one abutment substantially parallel to the first axis.

3. An assembly according to claim 1, wherein the at least one abutments is designed on the body so that at least one bearing surface of the abutment intersects the first axis when the tailgate is placed in the closed position on the body.

4. An assembly according to claim 1, wherein the at least one abutments is designed so that one end of the cylinder rests against the at least one abutment when the tailgate is placed in the closed position on the body.

5. An assembly according to claim 1, wherein the projection consists of a collar formed on the connecting part.

6. An assembly according to claim 1, wherein the at least one abutment is formed on the body by one of stamping and added to the body.

7. An assembly according to claim 1, wherein the tailgate comprises a box made at least partially from plastic material.

8. An automobile body-in-white belonging to the assembly according to claim 1.

9. An assembly according to claim 1, wherein the connecting part is made of metallic material.

10. An assembly according to claim 6, wherein the at least one abutment is welded to the body.

11. An assembly according to claim 7, wherein the box is made at least partially from reinforced thermoplastic material.

12. An assembly according to claim 11, wherein the reinforced thermoplastic material comprises fiberglass-reinforced polypropylene.

* * * * *